(12) United States Patent
Goi et al.

(10) Patent No.: US 6,561,940 B2
(45) Date of Patent: May 13, 2003

(54) METHOD OF AND APPARATUS FOR DRIVING AIRCRAFT GENERATOR AT A CONSTANT-SPEED

(75) Inventors: Tatsuhiko Goi, Kobe (JP); Koji Kawakami, Kobe (JP); Kenichiro Tanaka, Kobe (JP); Takayuki Isano, Akashi (JP); Hisashi Machida, Fujisawa (JP); Hiroyuki Ito, Fujisawa (JP); Shinji Miyata, Fujisawa (JP)

(73) Assignees: Kawasaki Jukogyo Kabushiki Kaisha, Kobe (JP); NSK Ltd., Tokyo-to (JP)

( * ) Notice: Subject to any disclaimer, the term of this patent is extended or adjusted under 35 U.S.C. 154(b) by 0 days.

(21) Appl. No.: 09/725,284

(22) Filed: Nov. 29, 2000

(65) Prior Publication Data
US 2001/0003108 A1 Jun. 7, 2001

(51) Int. Cl.$^7$ .......................... F16H 37/02; H02K 7/18
(52) U.S. Cl. .................. 475/208; 475/216; 477/42; 322/40
(58) Field of Search ........................ 475/208, 215, 475/216, 217; 477/37, 42; 322/40, 41

(56) References Cited

U.S. PATENT DOCUMENTS

| | | | |
|---|---|---|---|
| 3,576,143 A | | 4/1971 | Baits |
| 4,382,188 A | * | 5/1983 | Cronin ............... 290/1 C |
| 4,587,866 A | * | 5/1986 | Kraus .................. 475/208 |
| 4,734,590 A | * | 3/1988 | Fluegel ............... 290/1 C |
| 5,782,433 A | * | 7/1998 | Goi et al. ............. 244/60 |

FOREIGN PATENT DOCUMENTS

| | | |
|---|---|---|
| JP | 55 7780 B1 | 2/1980 |
| JP | 55 7781 B1 | 2/1980 |
| JP | 55 7782 B1 | 2/1980 |
| JP | A 62-100200 | 5/1987 |
| JP | 1-169169 | 7/1989 |
| JP | 4-327055 A  * | 11/1992 |
| JP | 11-63147 | 3/1999 |
| JP | A 11-210869 | 8/1999 |

OTHER PUBLICATIONS

H. Hato, et al. "Molecular structures of traction fluids in relation to traction properties", *Tribology Letters* 5 (1998) 69–74.

* cited by examiner

*Primary Examiner*—Ankur Parekh
(74) *Attorney, Agent, or Firm*—Oliff & Berridge, PLC

(57) ABSTRACT

An output rotational driving power of the engine is split into a first split power and a second split power. The first split power is transmitted to a continuously variable speed transmission that transmits the first split power by a shearing resistance of a fluid. The second split power is transmitted to a differential planetary gear system. An output power of the continuously variable speed transmission is transmitted to the differential planetary gear system to combine the first split power and the second split power in the differential planetary gear system. A variation of a rotating speed of the output rotational driving power is absorbed by the continuously variable speed transmission to adjust an output rotating speed of the differential planetary gear system to a constant speed.

19 Claims, 12 Drawing Sheets

METHOD OF AND APPARATUS FOR DRIVING AIRCRAFT GENERATOR AT A CONSTANT-SPEED

BACKGROUND OF THE INVENTION

1. Field of the Invention

The present invention relates to a method and an apparatus of driving an aircraft power generator at a constant-speed. More specifically, the present invention relates to a method of driving an aircraft power generator by the output power of the engine of an aircraft at a fixed operating speed regardless of the engine speed, and a constant-speed driving apparatus for carrying out the method.

2. Description of the Related Art

In an aircraft, such as a passenger jet airplane, a generator is driven by the rotational output of the main engine to generate AC power (three-phase, 115 V, 400 Hz) for operating electrical devices of the lighting system, the air conditioning system, the anti-icing system and the like. The thrust of a jet engine is adjusted by properly adjusting the engine speed and, generally, the engine speed changes according to the change of the thrust. Therefore, a constant-speed drive (CSD) capable of adjusting the variable input engine speed to a fixed rotational speed for driving the generator is necessary to generate AC power of a specified frequency, such as 400±7 Hz specified in MIL-STD-704E, by the variable rotational output of the jet engine. Integrated drive generators (IDGs) are prevalently used as aircraft power generators. The integrated drive generator is constructed by combining a constant-speed drive and a generator.

Such integrated generators are disclosed in Japanese Patent Publications Nos. 7780/1980, 7781/1980 and 7782/1908 which comprise a differential gear driven by the engine, a displacement hydraulic pump with motor, and a control circuit operated by a governor to change the volume of the displacement hydraulic pump. The displacement hydraulic pump is an oil-hydraulic pump. The generator is driven at a fixed rotating speed by controlling the output rotational speed of the differential gear by the oil-hydraulic pump and a hydraulic motor.

However, since the oil-hydraulic pump and the hydraulic motor are a piston pump and a piston hydraulic motor, the previous constant-speed drive has the following drawbacks.

(1) Since the piston pump and the piston hydraulic motors are provided with pistons that reciprocate in cylinders, seizure is liable to occur, joints are subject to fatigue failure and abrasion and are unsatisfactory in reliability. Incidentally, whereas demanded MTBUR (Mean Time Between Unscheduled Removal) is 15,000 hr, the mean of actual takedown times is 5,000 hr or below.

(2) Since the constant-speed drive uses hydraulic power as principal power, the power transmission efficiency of the constant-speed drive is as low as the order of 65%, which increases the fuel consumption of the aircraft. In a 150-passenger medium airplane, the constant-speed drive increases fuel consumption by about 1%.

(3) The complicated mechanism of the previous constant-speed drive deteriorates reliability, and increases weight and costs.

(4) Since the principal part of the previous constant-speed drive is a reciprocating mechanism, the rotating speed cannot be increased any further, and further weight and size reduction cannot be expected.

Thus, it is preferable to use a continuously variable speed transmission, such as a traction drive, capable of operating at a high rotating speed and has a life that can be exactly estimated. Since the continuously variable speed transmission comprises rotary components, the life thereof can be exactly estimated by a method similar to that of estimating the life of bearings. The employment of the continuously variable speed transmission, such as a traction drive, improves greatly the drawbacks in the mechanism including the oil-hydraulic pump and the hydraulic motor.

If the transmission mechanism of the constant-speed driving apparatus is so formed as to transmit all the power necessary for driving the generator, for example, only by a traction drive, the constant-speed drive, which meets dimension and weight requirements, might be unable to secure necessary durability thereof. Furthermore, the effect of the employment of the traction drive in improving efficiency is not satisfactory because the power transmission efficiency of the traction drive is on the order of 85%.

Mechanisms intended to provide an automotive continuously variable speed transmission having an extended life and capable of operating at an increased efficiency are disclosed in Japanese Laid-Open Publications Nos. 169169/1989 and 63147/1999. Each of those previously proposed mechanisms comprises a toroidal traction drive and a planetary gear in combination. However, those mechanisms cannot be used on aircraft for the following reasons.

(1) In some operating condition, 100% of power is transmitted to the traction drive and hence the traction drive must have heavy and large construction. If the traction drive is formed in dimensions not greater than those required of traction drives suitable for use on aircraft, the traction drive is unable to secure a necessary life.

(2) Power circulates in the planetary gear of the known mechanism. Therefore, power is consumed uselessly and dimensions of the planetary gear are unnecessarily large. The planetary gear is unable to secure a necessary life if the same is formed in dimensions not greater than those required of planetary gears for use on aircraft.

(3) Since the planetary gear is disposed outside the traction drive in the known mechanism, the mechanism has a large overall size.

(4) The constant-speed drive is unable to meet requisite conditions in order to be used on aircraft with respect to its weight, dimensions and life for the foregoing three reasons.

(5) Although an automotive continuously variable speed transmission is designed so that its gear ratio is controlled to make the engine operate at an engine speed at which the engine is able to produce a desired driving force and to operate at a minimum fuel consumption rate, the continuously variable speed transmission for driving the aircraft power generator must be designed to drive the generator at a fixed operating speed regardless of the variation of the engine speed.

SUMMARY OF THE INVENTION

The present invention has been made in view of the foregoing problems in the related art. It is therefore an object of the present invention to provide a method of driving an aircraft power generator installed on an aircraft at a constant-speed using constant-speed driving apparatus capable of operating at high efficiency with high reliability, having an extended life, formed in compact construction, and capable of driving the aircraft power generator for the stable generation of AC power of a fixed frequency according to the operating condition of the aircraft.

Another object of the present invention is to provide a constant-speed driving apparatus for carrying out the foregoing method of driving an aircraft power generator.

According to a first aspect of the present invention, a constant-speed driving method of driving an aircraft power generator installed on an aircraft by an engine of the aircraft at a constant-speed includes the steps of: splitting an output rotational driving power of the engine into a first split power and a second split power; transmitting the first split power to a continuously variable speed transmission that transmits the first split power by a shearing resistance of a fluid; transmitting the second split power to a differential planetary gear system; transmitting an output power of the continuously variable speed transmission to the differential planetary gear system to combine the first split power and the second split power in the differential planetary gear system; and absorbing a variation of a rotating speed of the output rotational driving power by the continuously variable speed transmission to adjust an output rotating speed of the differential planetary gear system to a constant speed.

Preferably, the second split power is transmitted to one of a sun gear, a planetary carrier and a ring gear of the differential planetary gear system; and the output power of the continuously variable speed transmission is transmitted to another one of the sun gear, the planetary carrier and the ring gear.

Preferably, the second split power is transmitted to one of the sun gear and the ring gear; and the output power of the continuously variable speed transmission is transmitted to another one of the sun gear and the ring gear.

Preferably, the sun gear, the planetary carrier and the ring gear are rotated in a same direction.

According to a second aspect of the present invention, a constant-speed driving apparatus for driving an aircraft power generator installed on an aircraft by an engine of the aircraft at a constant-speed comprises: a power splitting mechanism that splits an output rotational driving power of the engine into a first split power and a second split power; a continuously variable speed transmission to which the first split power is transmitted, the first split power being transmitted via the continuously variable speed transmission by a shearing resistance of a fluid; and a differential planetary gear system to which the second split power and an output power of the continuously variable speed transmission are transmitted, the first split power and the second split power are combined in the differential planetary gear system. A variation of a rotating speed of the output rotational driving power is absorbed by the continuously variable speed transmission to adjust an output rotating speed of the differential planetary gear system to a constant speed.

Preferably, the differential planetary gear system includes a sun gear, a planetary carrier and a ring gear; the second split power is transmitted to one of the sun gear, the planetary carrier and the ring gear; and the output power of the continuously variable speed transmission is transmitted to another one of the sun gear, the planetary carrier and the ring gear.

Preferably, the second split power is transmitted to one of the sun gear and the ring gear; and the output power of the continuously variable speed transmission is transmitted to another one of the sun gear and the ring gear.

Preferably, the sun gear, the planetary carrier and the ring gear are rotated in a same direction.

Preferably, the continuously variable speed transmission comprises a toroidal traction drive.

Preferably, the toroidal traction drive is a double-cavity toroidal traction drive; and the differential planetary gear system is disposed coaxially with the continuously variable speed transmission.

Preferably, the double-cavity toroidal traction drive comprises output disks which are disposed on opposite sides of the differential planetary gear system, respectively, and an output shaft which supports the output disks; and the output shaft of the double-cavity toroidal traction drive also serves as a sun gear of the differential planetary gear system.

Preferably, the differential planetary gear system comprises a planetary carrier and a ring gear having an external gear; and an output of the planetary carrier is transmitted through the external gear of the ring gear.

Preferably, a speed change ratio of the continuously variable speed transmission decreases with an increase of an engine speed of the engine with a result of a deceleration; and the speed change ratio increases with a decrease of the engine speed with a result of an acceleration.

According to a third aspect of the present invention, a control method of controlling the constant-speed driving apparatus as defined above comprises the steps of: controlling the continuously variable speed transmission so that a speed change ratio of an output rotating speed of the constant-speed driving apparatus to an input rotating speed of the constant-speed driving apparatus is fixed when an engine speed of the engine is below a predetermined low rotating speed; and controlling the continuously variable speed transmission so that the output rotating speed of the constant-speed driving apparatus is fixed when the engine speed of the engine is in a predetermined engine speed range which is above the predetermined low rotating speed.

Preferably, the output rotating speed of the constant-speed driving apparatus is measured by a rotating speed measuring device; and a deviation of the output rotating speed measured by the rotating speed measuring device from the input rotating speed is used as a speed change command signal to be given to the continuously variable speed transmission.

Preferably, a signal produced by adding a change rate of the input rotating speed and the deviation together is used as the speed change command signal to be given to the continuously variable speed transmission.

According to a fourth aspect of the present invention, a controller for controlling a constant-speed driving apparatus as defined above comprises: device for controlling the continuously variable speed transmission so that a ratio of an output rotating speed of the constant-speed driving apparatus to an input rotating speed of the constant-speed driving apparatus is fixed when an engine speed of the engine is below a predetermined low rotating speed, and device for controlling the continuously variable speed transmission so that the output rotating speed of the constant-speed driving apparatus is fixed when the engine speed of the engine is in a predetermined engine speed range which is above the predetermined low rotating speed.

Preferably, the output rotating speed of the constant-speed driving apparatus is measured by a rotating speed measuring device; and a deviation of the output rotating speed measured by the rotating speed measuring device from the input rotating speed is used as a speed change command signal to be given to the continuously variable speed transmission.

Preferably, a signal produced by adding a change rate of the input rotating speed and the deviation together is used as the speed change command signal to be given to the continuously variable speed transmission.

According to a fifth aspect of the present invention, an aircraft power generating system comprises: an aircraft power generator; a constant-speed driving apparatus as defined in claim 5; and a housing containing the constant-speed driving apparatus and the aircraft power generator.

The constant-speed driving apparatus and the method of driving an aircraft power generator at a constant-speed according to the present invention improve the efficiency and the reliability of the aircraft power generator more effectively than the previous constant-speed drive or method employing the oil-hydraulic pump and the hydraulic motor.

Since the rotational driving power for driving the generator is split to the continuously variable speed transmission utilizing the shearing resistance of a fluid and the power splitting shaft of the differential planetary gear system, the life of the speed changing means can be extended and power transmission efficiency can be improved.

Since the constant-speed driving apparatus has the foregoing features and is capable of high-speed driving, the constant-speed driving apparatus can be formed in lightweight, compact construction.

A control method according to the present invention is capable of controlling the constant-speed driving apparatus for operation matched with the operating characteristic of the aircraft.

In a preferred embodiment, the differential planetary gear system and the continuously variable speed transmission are disposed coaxially, and the sun gear of the differential planetary gear system serves also as the output member of the continuously variable speed transmission. Therefore, the differential planetary gear system can be installed in a greatly reduced space and the constant-speed driving apparatus can be easily formed in lightweight, compact construction.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Preferred embodiments of the present invention will be described hereinafter with reference to the accompanying drawings. It is to be understood that those embodiments are only examples and the present invention is not limited in its practical application to those specifically described herein.

Figure 1:
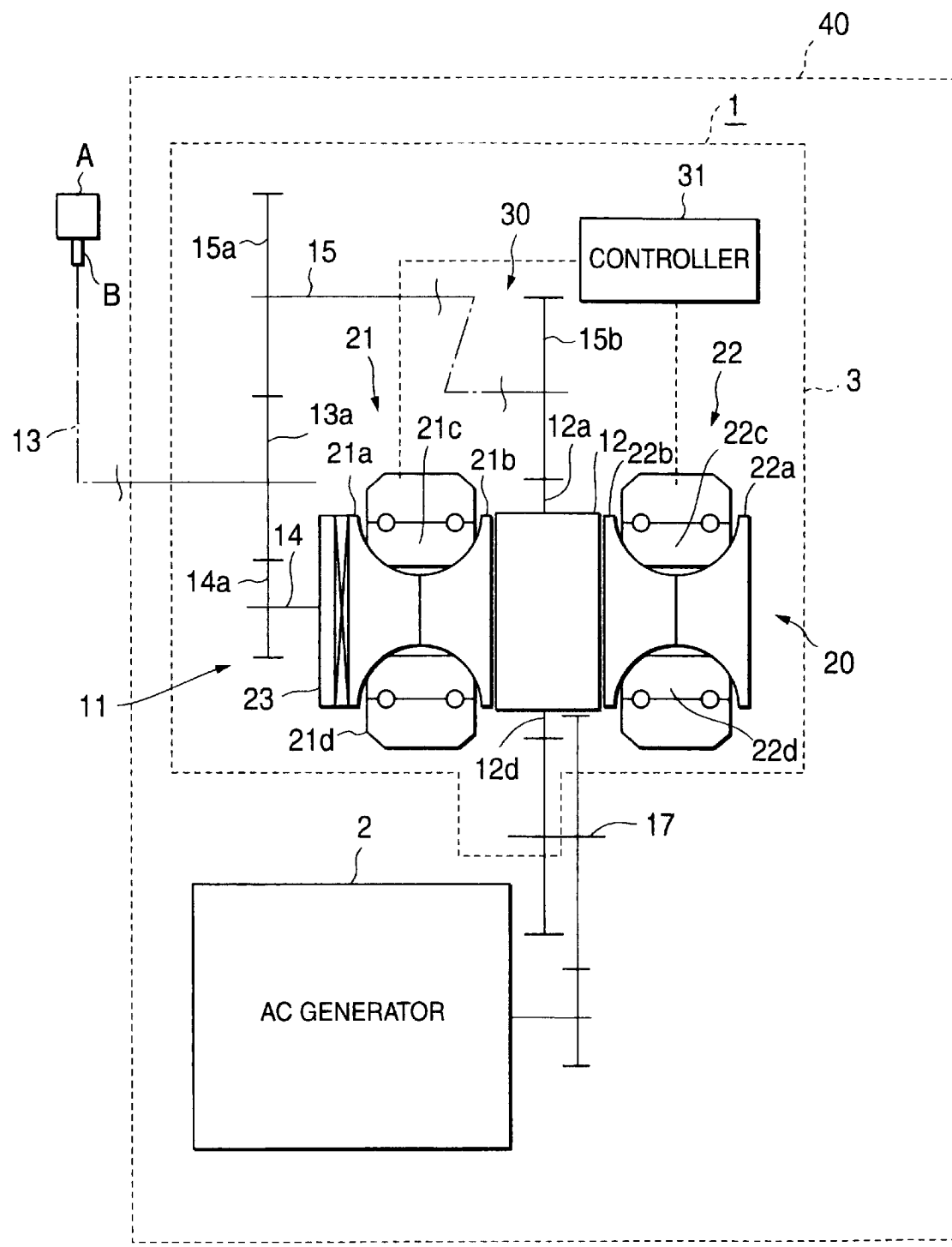
FIG. 1 is a diagrammatic view of an aircraft power generating system including a constant-speed driving apparatus in a first embodiment according to the present invention for driving an aircraft power generator.
Figure 2:
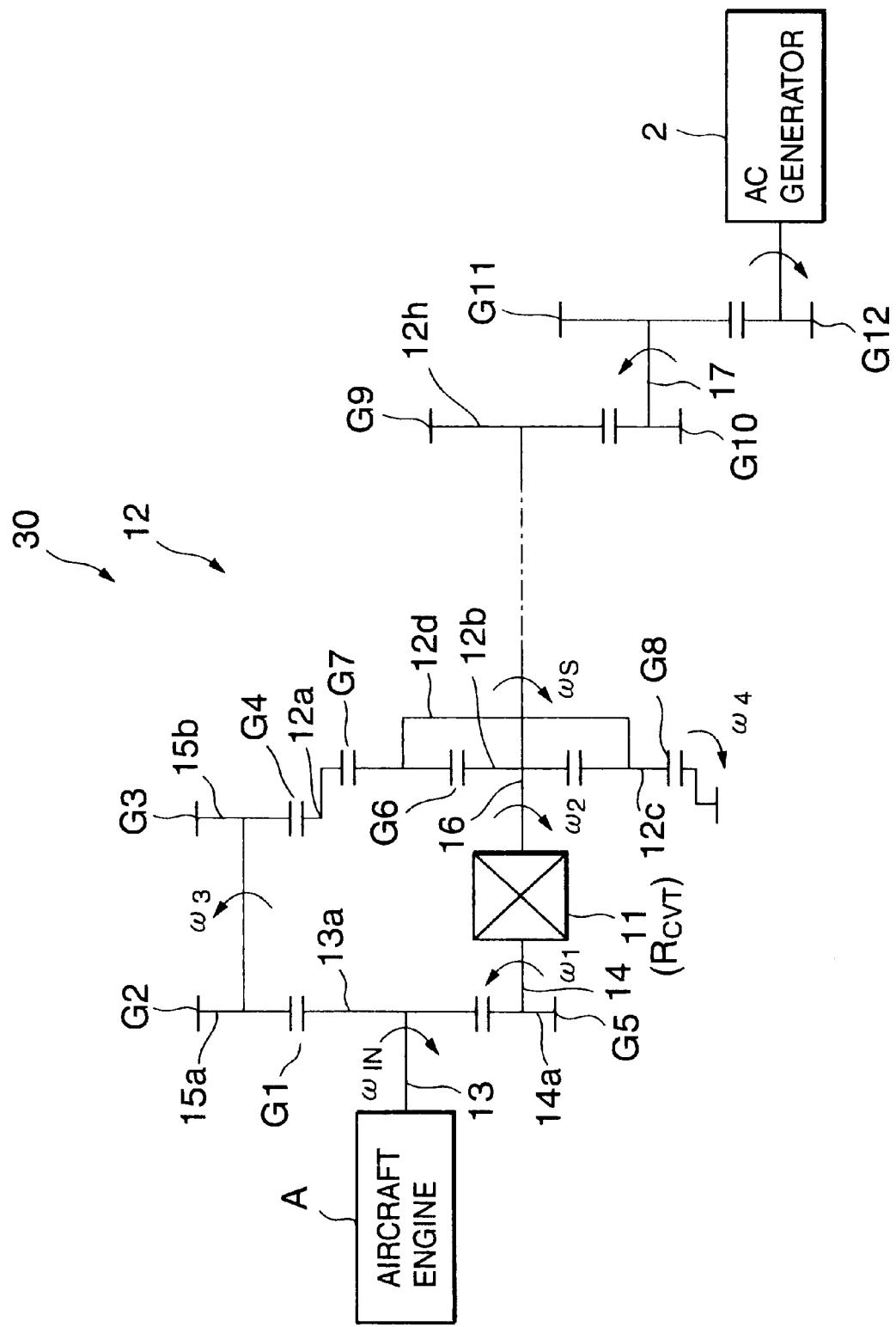
FIG. 2 is a diagrammatic view of gear trains included in the constant-speed driving apparatus shown in FIG. 1.

FIGS. 1 and 2 show the construction of an aircraft power generating system (hereinafter referred to simply as "power generating system") including a constant-speed driving apparatus 1 in a first embodiment according to the present invention and gear trains included in the constant-speed driving apparatus 1, respectively. The present power generating system can be configured as an IDG. The power generating system includes a constant speed driving apparatus 1, an ac generator 2 driven by an aircraft engine (hereinafter referred to simply as "engine") A, and a constant-speed driving apparatus 3 for driving the ac generator 2 at a fixed operating speed regardless of the engine speed of the engine A.

The ac generator 2 is driven for operation at a fixed operating speed of, for example, 24,000 rpm to generate AC power of a specified frequency (400±7 Hz specified in MIL-STD-704E). The ac generator 2 is of a known configuration and hence the description thereof will be omitted.

The constant-speed driving apparatus 3 includes a speed change mechanism (means) 30 including a high-speed traction continuously variable speed transmission (hereinafter referred to simply as "traction continuously variable speed transmission") 11 and a differential planetary gear system 12 having a power splitting shaft 15 for splitting input power to the traction continuously variable speed transmission 11 and the differential planetary gear system 12, and a controller 31 for controlling the speed change ratio of the speed change mechanism 30.

Figure 4:
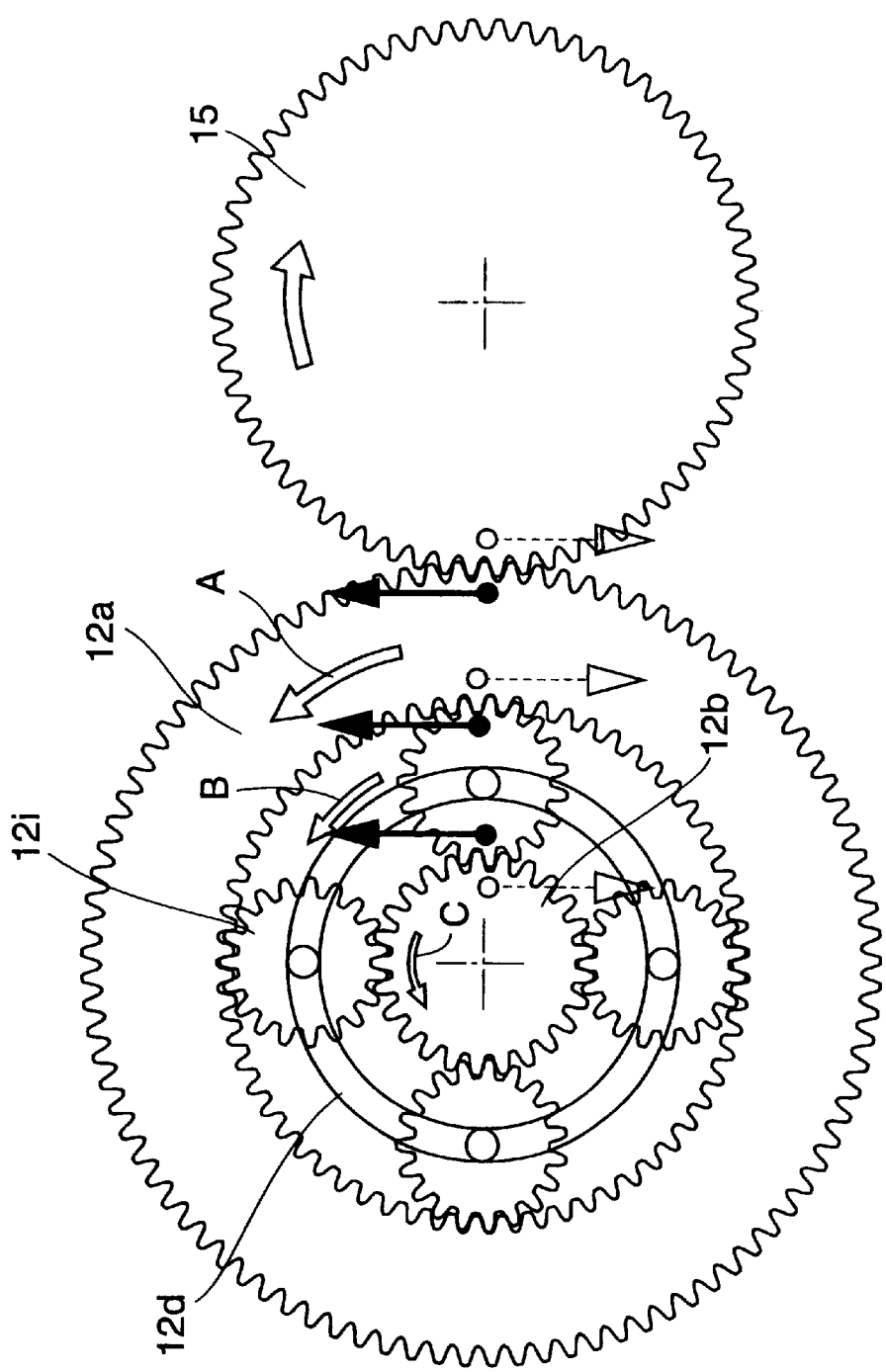
FIG. 4 is a sectional view of the constant-speed driving apparatus shown in FIG. 3.

As shown in FIG. 4, a plurality of planetary gears 12i are rotatably mounted on the planetary carrier 12d. As indicated by arrows A, B, C, the ring gear 12a, the planetary carrier 12d and the sun gear 12b rotate in the same direction. In order to rotate them in the same direction, the driving force from the engine A is supplied to the ring gear 12a or the sun gear 12b, and the output power of the traction continuously variable speed transmission 11 is supplied to the sun gear 12b or the ring gear 12a. When the ring gear 12a, the planetary carrier 12d and the sun gear 12b rotate in the same direction, the efficiency of power transmission in the constant-speed driving apparatus 1 is enhanced.

The relation between the traction continuously variable speed transmission 11 and the differential planetary gear system 12 will be briefly described with reference to FIGS. 1 to 4. The traction continuously variable speed transmission 11 has a double-cavity toroidal traction drive 20, and a principal part of the differential planetary gear system 12 including a ring gear 12a and a sun gear 12b are interposed between cavities 21 and 22. The respective output disks 21b and 22b of the cavities 21 and 22 are disposed on the opposite sides of the principal part of the differential planetary gear system 12, respectively. The sun gear 12b of the differential planetary gear system 12 serves as the output shaft 16 of the traction continuously variable speed transmission 11.

Figure 5:
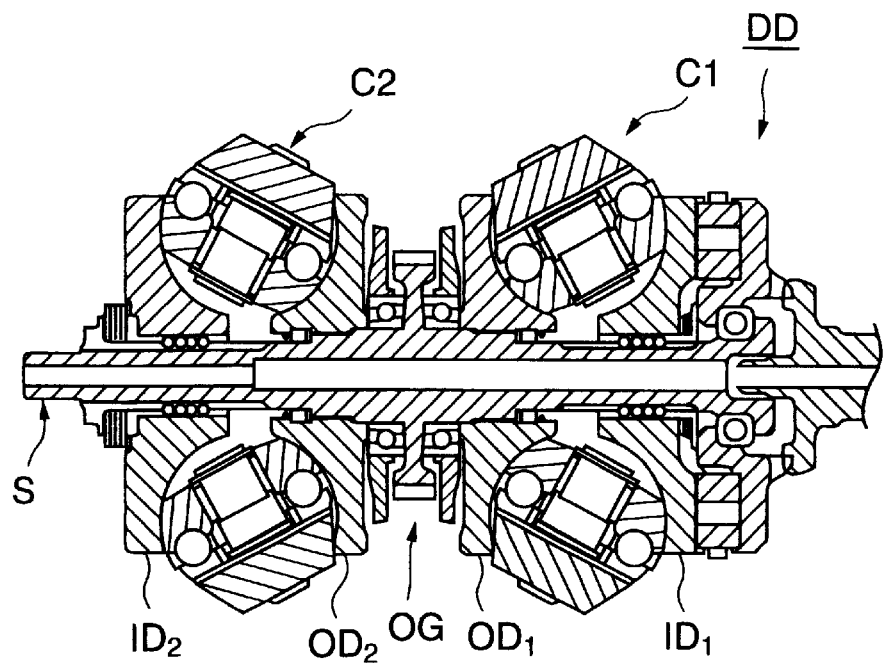
FIG. 5 is a longitudinal sectional view of a double-cavity toroidal traction drive.

As shown in FIG. 5, a double-cavity toroidal traction drive DD has cavities C1 and C2 mounted on a rotating shaft S and spaced a predetermined interval apart from each other. Input disks $ID_1$ and $ID_2$ are disposed on the outer side of the cavities C1 and C2, respectively, and are connected by an intermediate shaft. Output disks $OD_1$ and $OD_2$ are disposed in the inner side of the cavities C1 and C2, respectively and are connected together by an output shaft. An output gear OG is mounted on a middle part of the output shaft.

Figure 6:
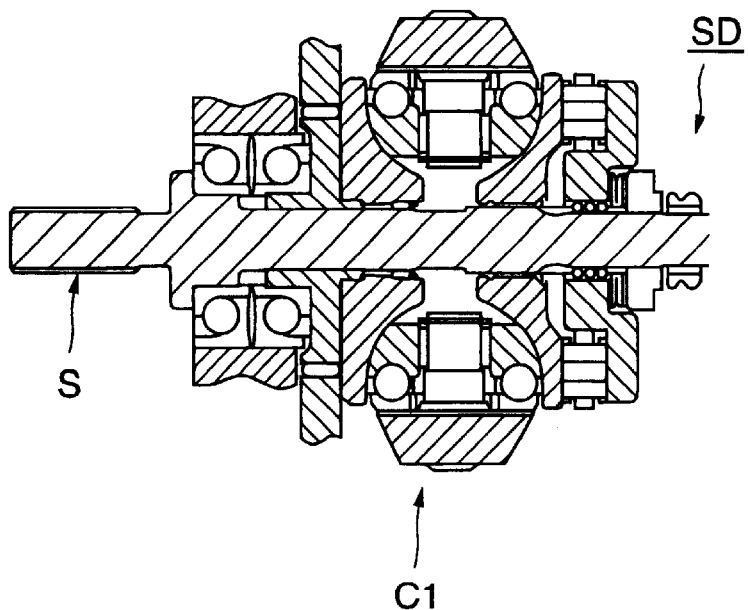
FIG. 6 is a longitudinal sectional view of a single-cavity toroidal traction drive.
Figure 7:
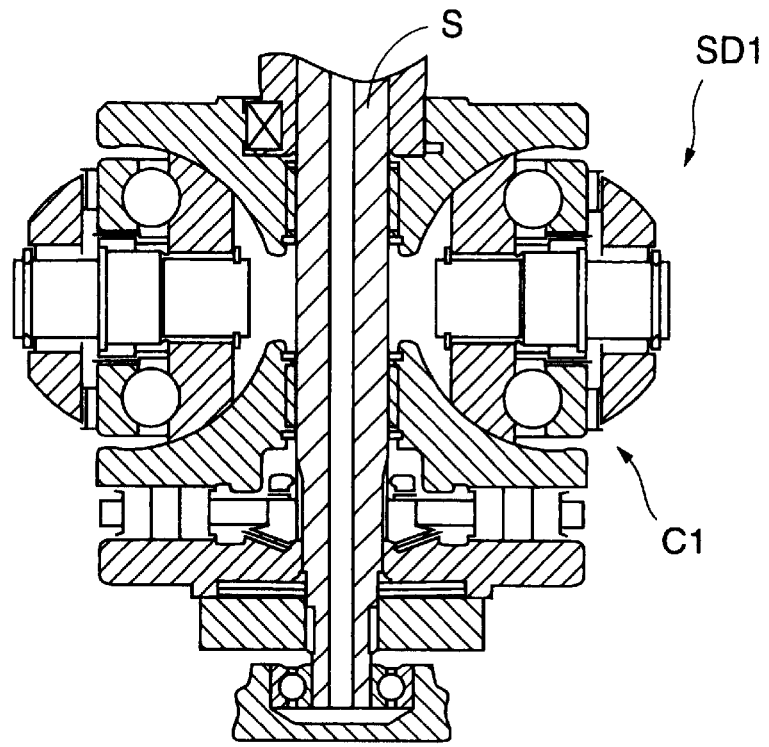
FIG. 7 is a longitudinal sectional view of a half-toroidal traction drive.
Figure 8:
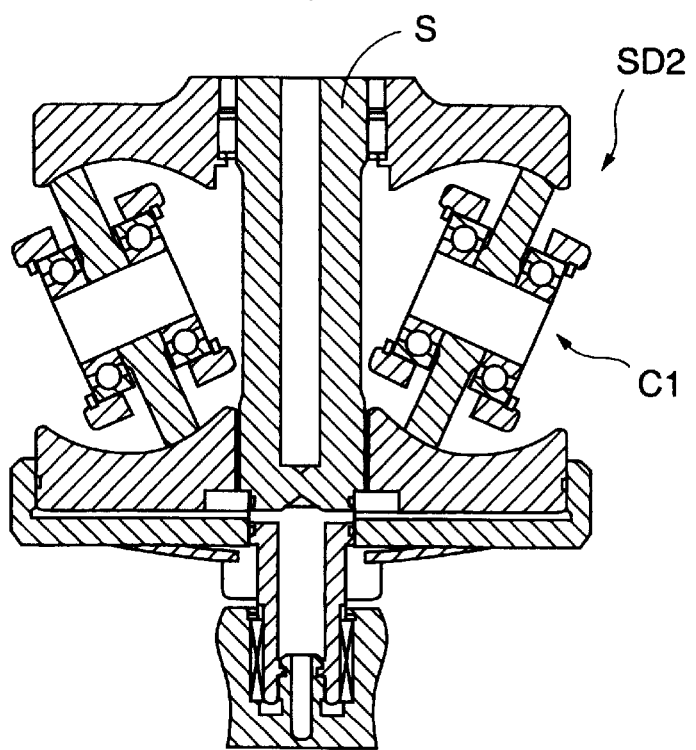
FIG. 8 is a longitudinal sectional view of a full-toroidal traction drive.

As shown in FIG. 6, a single-cavity toroidal traction drive SD has a single cavity C1. Toroidal traction drives are classified into those of half toroidal type SD1 as shown in FIG. 7 and those of full toroidal type SD2 as shown in FIG. 8. The present invention may employ either a toroidal traction drive of half toroidal type or that of full toroidal type. The toroidal traction drive employed in this embodiment is of half toroidal type.

The traction continuously variable speed transmission 11 may employ a single-cavity toroidal traction drive instead of the double-cavity toroidal traction drive 20. However, in view of reducing frictional loss and to provide the continuously variable speed transmission 11 with a large capacity, it is preferable to employ the double-cavity toroidal traction drive 20.

The speed change ratio range of the double-cavity toroidal traction drive 20 is 0.5 to 2.0. The speed change ratio of 2.0 is used as the upper limit of the speed change ratio range of the double-cavity toroidal traction drive 20 to reduce the spin of contact parts, to enable the output shaft 16 of the double-cavity toroidal traction drive 20 to rotate at a high rotating speed of 15,000 rpm and to construct the double-cavity toroidal traction drive 20 in lightweight construction. The speed changing mechanism of the double-cavity toroidal traction drive 20 will be described later.

The input shaft 13 of the constant-speed driving apparatus 1 is connected to a shaft B of the engine A. Output power of the engine A is transmitted through the shaft B and the input shaft 13 to the constant-speed driving apparatus 3. The input shaft 13 is provided with a gear 13a engaged with a gear 14a mounted on an input shaft 14 included in the traction continuously. variable speed transmission 11. The input shafts 13 and 14 are interlocked with each other via gears 13a and 14a. An idler shaft 15 (power splitting shaft 15) has one end provided with a gear 15a engaged with the gear 13a and the other end provided with a gear 15b. The gear 15b is engaged with the ring gear 12a to connect the differential planetary gear system 12 to the input shaft 13. The rotational power of the engine A transmitted through the shaft B to the constant-speed driving apparatus 3 is split to the traction continuously variable speed transmission 11 and through the power splitting shaft 15 to the differential planetary gear system 12. The power ratio $P_{CVT}$:$P_R$ between power $P_{CVT}$ split to the traction continuously variable speed transmission 11 and power $P_R$ split to the differential planetary gear system 12 will be described below on an assumption that the gears and the continuously variable speed transmission 11 do not cause any power loss.

The power ratio $P_{CVT}$:$P_R$ can be represented by the product of torque ratio and speed ratio. The torque ratio, i.e., the ratio between torques split respectively to the traction continuously variable speed transmission 11 and the differential planetary gear system 12, is uniquely dependent on ratio $i_0$=G7/G6, where G6 is the number of teeth of the sun gear 12b and G7 is the number of teeth of the internal gear of the ring gear 12a of the differential planetary gear system 12. Thus, $$T_{CVT}:T_R=1: i_0 \qquad (1)$$

where $T_{CVT}$ is torque split to the traction continuously variable speed transmission 11 and $T_R$ is torque split to the ring gear 12a of the differential planetary gear system 12.

The respective rotating speeds of the sun gear 12b, the ring gear 12a and the planetary carrier 12d can be uniquely determined by Expression (2).

$$\omega_S=(\omega_2+i_0\cdot\omega_4)/(1+i_0) \qquad (2)$$

where $\omega_S$ is the rotating speed of the planetary carrier 12d, $\omega_2$ is the rotating speed of the sun gear 12b and $\omega_4$ is the rotating speed of the ring gear 12a.

The relation between the respective rotating speeds of the input shaft 13 and the planetary carrier 12d is determined uniquely by Expression (3).

$$\omega_S=(i_1\cdot R_{CVT}+i_0\cdot i_2\cdot i_3)\omega_{IN}/(1+i_0) \qquad (3)$$

where $i_1$=G1/G5, $i_2$=G1/G2, $i_3$=G3/G4, $\omega_{IN}$ is the rotating speed of the input shaft 13, $R_{CVT}$ is the speed change ratio of the traction continuously variable speed transmission 11 (speed decreasing mode: $R_{CVT}$<1, speed increasing mode: $R_{CVT}$>1), G1, G2, G3, G4 and G5 are the respective numbers of teeth of the gear 13a, the gear 15a, the gear 15b the external gear of the ring gear 12a and the gear 14a, $\omega_2=R_{CVT}\cdot i_1\cdot\omega_{IN}$ and $\omega_4=i_2\cdot i_3\cdot\omega_{IN}$.

It is known from Expression (3) that the rotating speed $\omega_S$ of the planetary carrier 12d can be maintained at a specified speed regardless of the variation of the rotating speed $\omega_{IN}$ of the input shaft 13 by controlling the speed change ratio $R_{CVT}$ so that a change in the rotating speed $\omega_{IN}$ of the input shaft 13 is counterbalanced by the ratio change of the traction continuously variable speed transmission 11.

The power ratio is expressed by Expression (4) because the ratio between the power split to the traction continuously variable speed transmission 11 and the power split through the power splitting shaft 15 to the ring gear 12a is the ratio between the products each of torque ratio expressed by Expression (1) and rotating speed ratio between the rotating speed $\omega_2$ of the sun gear 12b and the rotating speed $\omega_4$ of the ring gear 12a.

$$P_{CVT}:P_R=1\cdot\omega_2:\omega_4\cdot i_0=R_{CVT}\cdot i_1:i_0\cdot i_2\cdot i_3 \qquad (4)$$

where $P_{CVT}$ is the power split to the traction continuously variable speed transmission 11 and $P_R$ is the power split to the ring gear 12a of the differential planetary gear system 12.

Figure 3:
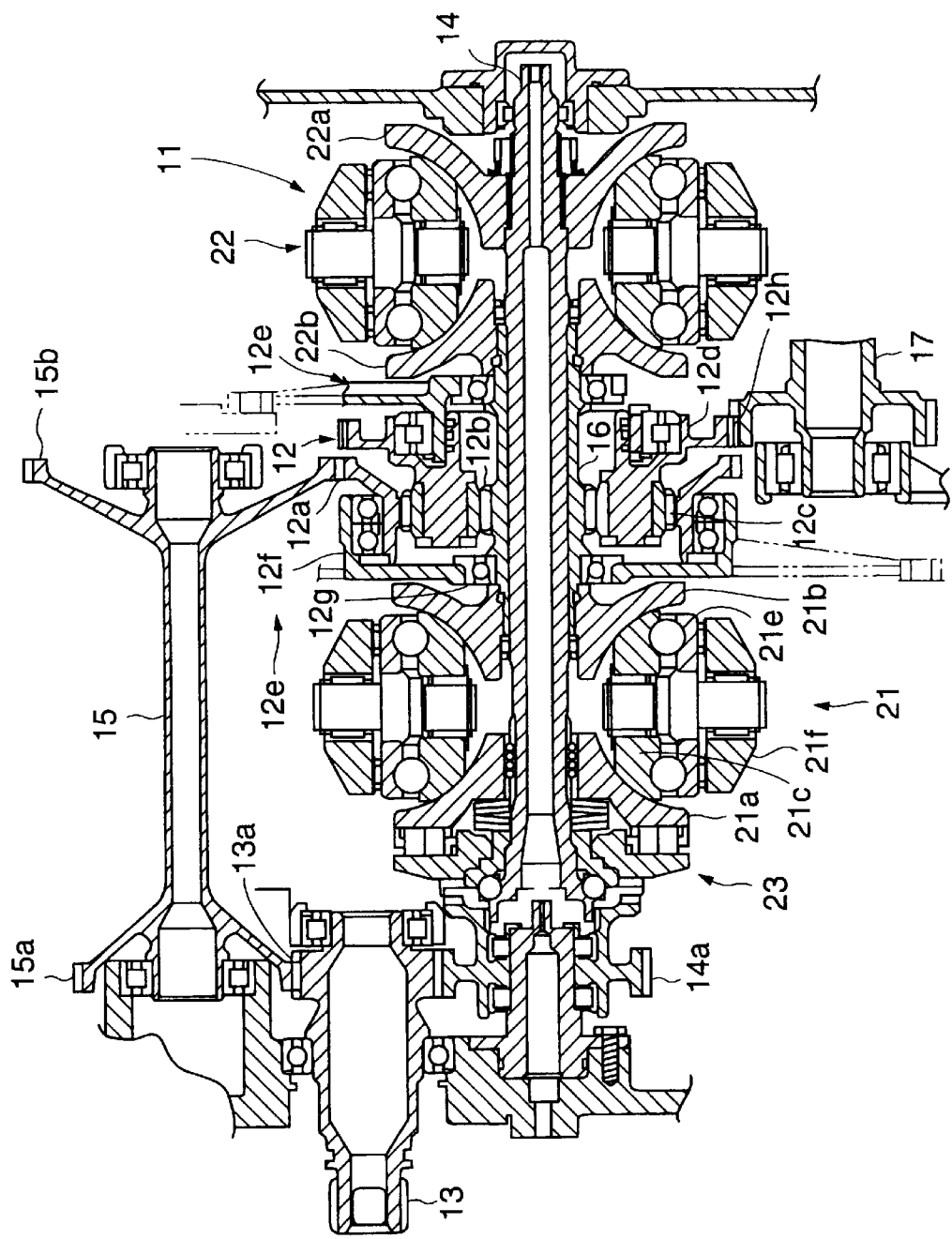
FIG. 3 is a longitudinal sectional view of the constant-speed driving apparatus shown in FIG. 1.

The traction continuously variable speed transmission 11 will be described hereinafter. As shown in FIG. 3, the cavities 21 and 22 have, respectively, input disks 21a and 22a that rotate together with the input shaft 14 of the traction continuously variable speed transmission 11, output disks 21b and 22b that rotate together with the output shaft 16 of the traction continuously variable speed transmission 11, four sets of power rollers 21c and 22c disposed between input disks 21a and 22a and between the output disks 21b and 22b, and thrust generating mechanism 23 for generating pressure to be applied to the power rollers 21c and 22c. As mentioned above, the sun gear 12b of the differential planetary gear system 12 is fixedly mounted on the middle part of the output shaft 16 or formed integrally with the middle part of the output shaft 16. Thus, the sun gear 12b serves also as the output shaft 16.

As shown in FIG. 3, a support member 12f supporting the differential planetary gear system 12 for rotation and a support member 12e support the output shaft 16 of the output disks 21b and 22b. Namely, bearings 12g are mounted on the output shaft 16, and the support members 12e and 12f support the output shaft 16 via bearings 12g. Thus, the constant-speed driving apparatus 3 can be formed in compact construction. The output power of the differential planetary gear system 12 can be smoothly transmitted through the external gear 12h combined with or formed integrally with the planetary carrier 12d. The power rollers 21c and 22c are supported on thrust bearings 21e and known trunnions 21f, i.e., support members, for rotation on roller shafts, and can be tilted in a plane including roller shafts 21d and 22d and the input shaft 14.

Figure 9:
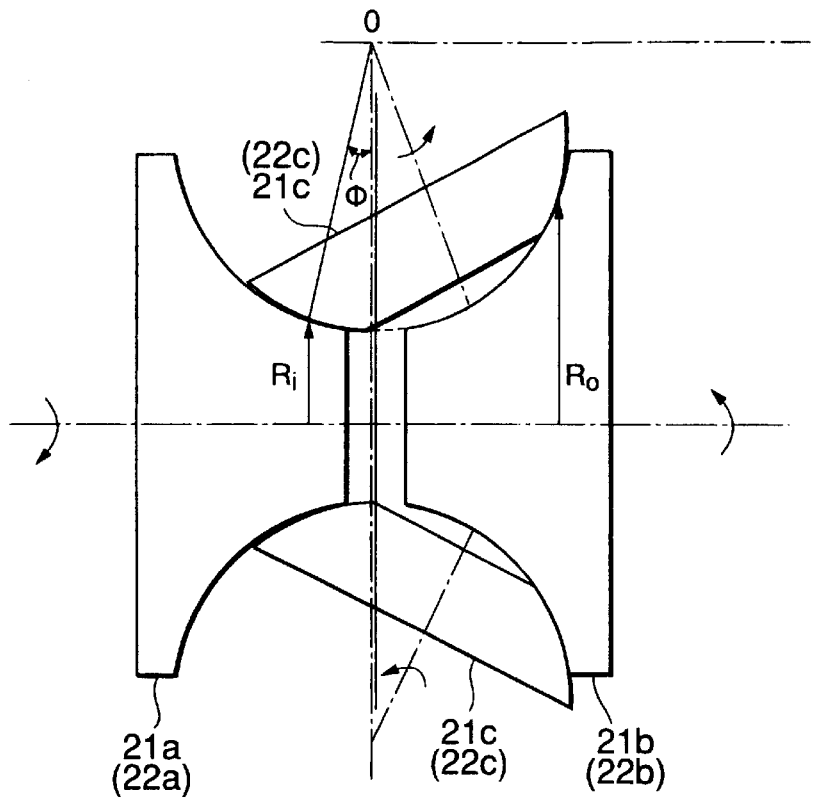
FIG. 9 is a diagrammatic view of assistance in explaining a toroidal traction drive.

In the cavities 21 and 22, the input disk 21a, the output disk 21b and the power roller 21c, i.e., three kinds of rolling embers, and the input disk 22a, the output disk 22b and the power roller 22c, i.e., three kinds of rolling members, are pressed together by high pressure to transmit power by the shearing resistance of highly viscous lubricating oil films formed between contact parts. This speed changing method varies speed change ratio optionally in a predetermined range of, for example, 0.5 to 2.0 by varying the tilt of the power rollers 21c and 22c, i.e., tilt angle Φ (FIG. 9). The change of the tilt angle Φ for speed changing operation will be concretely described later.

Figure 10:
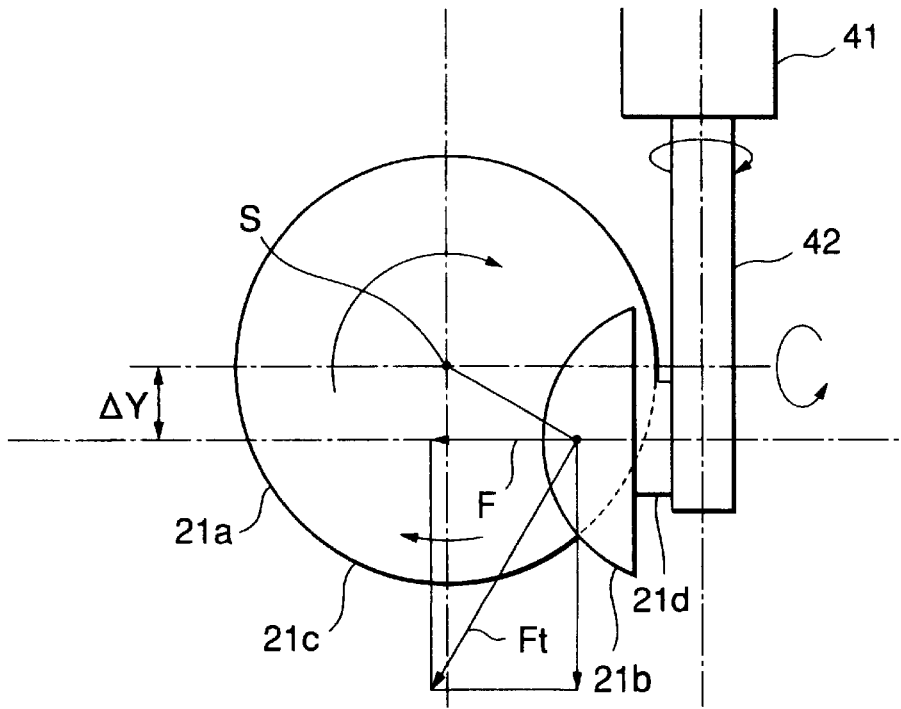
FIG. 10 is a diagrammatic view of assistance in explaining the principle of changing inclination by means of trunnions.

A method of changing the tilt angle Φ will be described in connection with the cavity 21 with reference to FIGS. 9 and 10. A piston rod 42 included in a hydraulic actuator (hereinafter referred to simply as "actuator") 41 and engaged with a driving shaft for tilting the trunnion 21f is advanced or retracted to displace the driving shaft by ΔY from the shaft axis. Then, a force Ft acting in a direction tangent to the power roller 21c is produced, and a component F of the force Ft tilts the power roller 21c to a new balanced position and the tilt angle Φ changes. Thus, the tilt angle Φ can be adjusted to a desired angle by properly adjusting the projection of the piston rod 42 of the actuator 41 to achieve desired speed change.

An excessively large tilt angle Φ will cause excessive spin that will make power transmission characteristic unsatisfactory. Therefore, the tilt angle Φ must be within a predetermined range. The cavities 21 and 22 are provided with mechanical stoppers, not shown, to determine the predetermined range for the tilt angle Φ.

Referring to FIG. 9, speed change ratio $R_{CVT}$ is expressed by: $R_{CVT}=N_O/N_i=R_i/R_o$, where $R_i$ is input working radius, i.e., the distance between the axis of rotation and a position where the power roller 21c (22c) is in contact with the input disk 21a (22a), $R_o$ is output working radius, i.e., the distance between the axis of rotation and a position where the power roller 21c (22c) is in contact with the output disk 21b (22b), $N_i$ is the rotating speed of the input shaft and the input disk 21a (22a) and $N_o$ is the rotating speed of the output shaft and the output disk 21b (22b). The radii $R_i$ and $R_o$ can be continuously varied by varying the tilt angle Φ of the power rollers 21c (22c) to vary the speed change ratio $N_o/N_i$ continuously.

The speed change ratio is equal to the ratio of the distance $R_i$ between the axis of rotation and the position where the input disk 21a (22a) is in contact with the power roller 21c (22c) to the distance $R_o$ between the axis of rotation and the position where the output disk 21b (22b) is in contact with the power roller 21c (22c), i.e., $R_i/R_o$. Thus, the speed change ratio can be continuously changed by varying the tilt angle Φ of the power rollers 21c (22c).

The differential planetary gear system 12 will be described hereinafter. As mentioned above, the differential planetary gear system 12 comprises the ring gear 12a connected with the input shaft 13 of the constant-speed driving apparatus 3 by the idler (power splitting shaft) 15, the sun gear 12b fixed to or formed integrally with the output shaft of the traction continuously variable speed transmission 11, a plurality of planet pinions 12c interposed between the ring gear 12a and the sun gear 12b, the planetary carrier 12d that rotates according to the rotation of the planet pinions 12s about the sun gear 12b, and support members 12e and 12f supporting the ring gear 12a, the planet pinions 12c and the carrier 12d for rotation.

In the differential planetary gear system 12, the planet pinions 12c are supported for free rotation on the planetary carrier 12d, and the ring gear 12a and the sun gear 12b are rotatable. The differential planetary gear system 12 has the idler (power splitting shaft) 15. Therefore, the rotational driving force for driving the generator 2 can be split to the traction continuously variable speed transmission 11 and the power splitting shaft 15. The power ratio is expressed by Expression (4).

The rotating speed of the sun gear 12b is varied by the traction continuously variable speed transmission 11 according to the variation of the rotating speed of the input shaft 13 (hereinafter referred to as "input rotating speed") so as to meet he condition expressed by Expression (3) to maintain the rotating peed of the planetary carrier 12d at a fixed value of, for example, 6255 rpm. The rotating speed of the planetary carrier 12d is raised by an idler 17 to drive the generator 2 for operation at a fixed operating speed of, for example, 24,000 rpm. In the following description, the operating speed of the generator 2 is regarded as the output rotating speed of the constant-speed driving apparatus 3. The sun gear 12b, the ring gear 12a and the planetary carrier 12d must rotate in the same direction to deliver output without power loss through the planetary carrier 12d. The following expressions must be met to make the sun gear 12b, the ring gear 12a and the planetary carrier 12d rotate in the same direction.

$$0<\omega_4<\omega_5<\omega_2 \quad (5)$$

$$0<\omega_2<\omega_5<\omega_4 \quad (6)$$

If the sun gear 12b, the ring gear 12a and the planetary carrier 12d do not rotate in the same direction, power circulates in the loop of gear train with a result of reducing efficiency.

When the engine speed increases, the speed change ratio of the traction continuously variable speed mechanism 11 decreases. The traction continuously variable speed mechanism 11 functions as a reduction gear to prevent the output disks 21b, 22b and the power rollers 21c, 22c from rotating at excessively high speeds. As a result, the unstable control of the traction continuously variable speed transmission 11 can be prevented.

The rotational driving force for driving the generator 2 is transmitted through both the traction continuously variable speed transmission 11 and the differential planetary gear system 12 instead of transmitting the same only through the traction continuously variable speed transmission 11. Therefore, the life of the traction continuously variable speed transmission 11 can be extended and the traction continuously variable speed transmission 11 can be formed in lightweight construction.

Generally, a maximum power that can be transmitted by the continuously variable speed transmission is relatively low. However, the splitton of power to the traction continuously variable speed transmission 11 and the differential planetary gear system 12 raises the upper limit of power that can be transmitted by the constant-speed driving apparatus 3. The constant-speed driving apparatus 3 is able to transmit power at a power transmission efficiency of about 95% because the differential planetary gear system 12 is able to operate at an efficiency of 99% or above.

Figure 11:
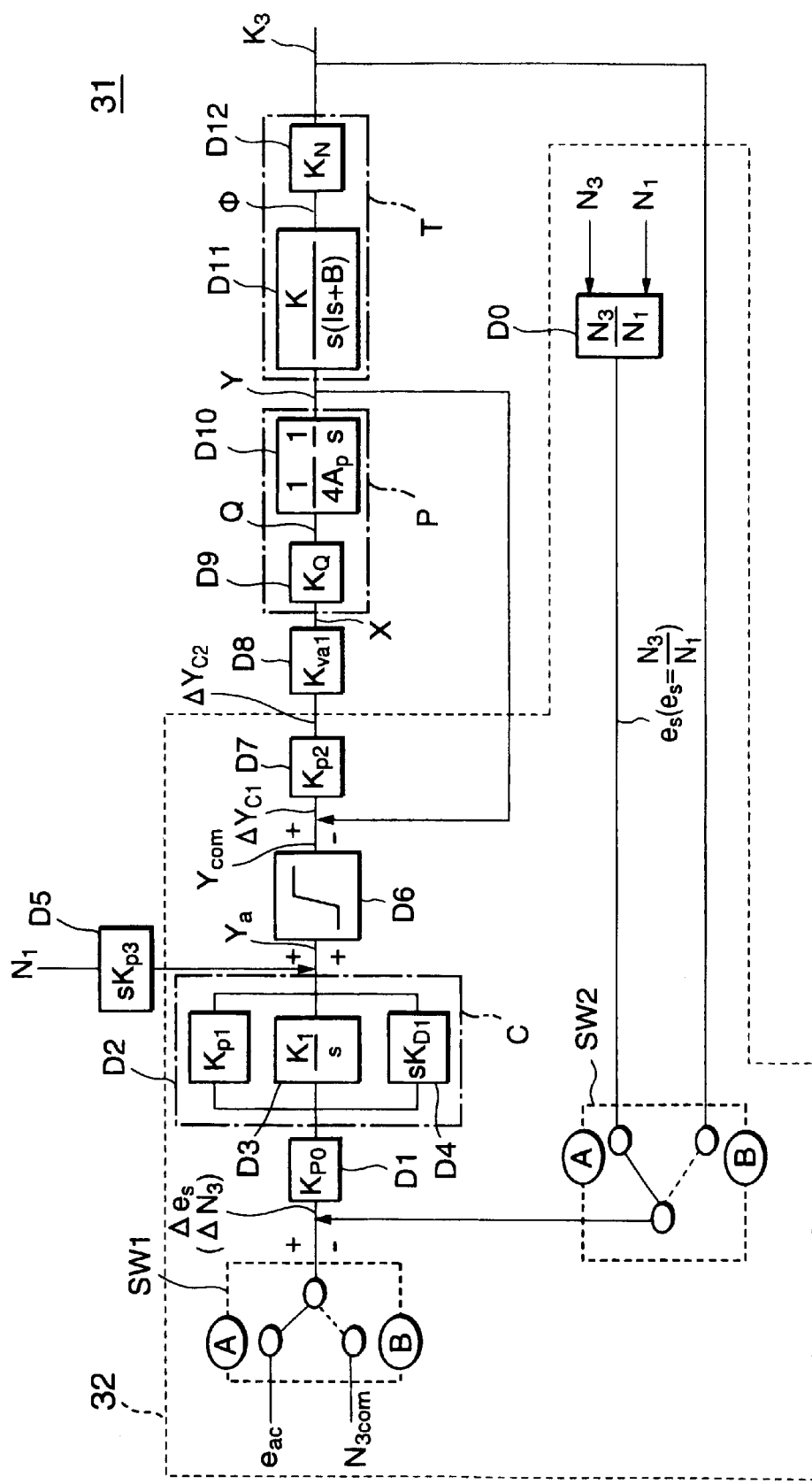
FIG. 11 is a block diagram of a transfer function representing the contents of IDG control.

An operation by the controller 31 of the constant-speed driving apparatus 3 for the speed change ratio control (hereinafter referred to as "IDG control") will be described hereinafter. Referring to FIG. 11 showing an IDG control loop 31 in a block diagram, the IDG control loop 31 has an amplifier 32 serving as a regulator, and a component indicating mechanical characteristic, such as the actuator 41 for driving the trunnions 21f, i.e., controlled members, and the speed change mechanism, i.e., a transfer function of a controlled system. A block D0 calculates a speed change ratio $e_s$ from the ratio between input rotating speed $N_1$ and output rotating speed $N_3$. A block D1 is a proportional element that regulates the overall gain of a PID regulator C including blocks D2, D3 and D4 keeping the ratio between the parameters of the PID regulator C. The blocks D2, D3 and D4 are a proportional element, an integral element and a derivative element, respectively, of the PID regulator C. A block D5 is a derivative element that calculates a disturbance using an input rotational acceleration determined on the basis of the input rotating speed $N_1$. A block D6 is a limiter, a block D7 is a proportional element that calculates piston position command $Y_{com}$ using a positional deviation $\Delta Y$ and a block D8 is a spool characteristic element having a transfer function representing the displacement characteristic of a spool. Blocks D9 and D10 are the components of a piston rod operation characteristic element P having a transfer function representing the operating characteristic of the piston rod 42 of the hydraulic actuator 41. Blocks D11 and D12 are the components of a tilt motion characteristic element T having a transfer function representing the tilting characteristic of the power rollers 21c and 22c. The input to the block D5 may be the engine speed.

Basically, the IDG control controls the speed change ratio $e_S=N_3/N_1$ of the constant-speed driving apparatus 3 so that the output rotating speed $N_3$ of the constant-speed driving apparatus 3 is kept constant by adjusting the position Y of the piston rod of the actuator 41 for driving the trunnions 21f and 22f by an electronic hydraulic servomechanism to change the tilt angle Φ of the power rollers 21c and 22c of the cavities 21 and 22. However, as mentioned above, since the speed change ratio of the traction continuously variable speed transmission 11 can be varied within the limited speed change ratio range, the control mode of the IDG control loop is changed according to the input rotating speed $N_1$; that is the IDG control loop operates in either a first control mode or a second control mode.

The first control mode is a constant-ratio control mode in which a speed ratio feedback control operation is carried out to maintain the speed change ratio e. at a speed change ratio command $e_{SC}$ when the input speed $N_1$ is below 4500 rpm while the engine is stopped or in an initial period subsequent to the start of the engine. The second control mode is a constant-speed control mode in which an output rotating speed feedback control operation is carried out to maintain the output rotating speed $N_3$ at a desired output rotating speed command $N_{3com}$ in a period in which the engine operates in the normal operating condition excluding the period in which the engine is stopped or the engine is operating at engine speeds below 4500 rpm. Either the first control mode or the second control mode is selected by a mode selecting control operation. The first control mode and the second control mode are necessary for the following reasons.

While the aircraft is in operation, the engine operates at engine speeds in a low-speed range for a state where the engine is stopped or the engine is in an initial operating state subsequent to the start of the engine or at engine speeds in a high-speed range for a state where the engin is operating for a takeoff, a landing or a cruise flight. As mentioned above, the speed change ratio of the traction continuously variable speed transmission 11 can be varied within the limited speed change ratio range. More concretely, supposing that it is desired to maintain the operating speed $N_3$ of the generator 2 at 24,000 rpm, the input rotating speed $N_1$ to the constant-speed driving apparatus 3 must be in the range of 4,500 to 9,200 rpm and the total speed change ratio $N_3/N_1$ must be in the range of 5.333 to 2.608.

Accordingly, the control operation is unable to maintain the rotating speed $N_3$ at 24,000 rpm if the input rotating speed $N_1$ is below 4,500 rpm. Therefore, this embodiment executes the control operation in the constant-ratio control mode to keep the speed change ratio $e_S$ constant when the input rotating speed $N_1$ is below 4,500 rpm. If the control operation is executed to maintain the rotating speed $N_3$ at the desired rotating speed 24,000 rpm when the input rotating speed $N_1$ is below 4,500 rpm, it is impossible to achieve the desired rotating speed mechanically. Consequently, the actual rotating speed deviates at all times from the desired rotating speed by some deviation and the actuator 41 continues making effort to eliminate the deviation even though its operation is restricted by the mechanical stopper. Consequently, the operation of the actuator 41 becomes unstable, stable control operation cannot be achieved and slip is caused in the traction continuously variable speed mechanism 11.

The controller 31 selects either the first control mode or the second control mode by controlling switches SW1 and SW2 according to the input rotating speed $N_1$. The switches SW1 and SW2 are controlled so as to select circuits connected to terminals A when selecting the first control mode. The switches SW1 and SW2 are controlled so as to select circuits connected to terminals B when selecting the second control mode. The switches SW1 and SW2 are operated simultaneously for switching.

In the first control mode, the following control operation is carried out to keep the speed change ratio $e_S$ constant. In this case, the generator 2 is not driven for operation at the predetermined operating speed of 24,000 rpm and the power generating system does not generate power. Therefore, an auxiliary power generating unit (APU) is used for power generation.

(1) The block D0 calculates the speed change ratio $e_S$ by using the input rotating speed $N_1$ and the output rotating speed $N_3$ measured by a rotating speed measuring device, not shown.

(2) The speed change ratio $e_S$ is given through the switch SW2 to the input of the block D1, and a deviation $\Delta e_S$ of the calculated speed change ratio $e_S$ from a speed change ratio command $e_{SC}$ is given to the input side of the block D1.

(3) The deviation $\Delta e_S$ is given to the block D1, and the block D1 processes the deviation $\Delta e_S$ by using a proportional gain $K_{p0}$ and gives its output to the PID regulator C.

(4) The PID regulator C processes the deviation $\Delta e_S$ provided by the block D1 and gives a position control command to the block D6. Concretely, the position control command is a piston position command $Y_{com}$ specifying a position of the piston rod.

(5) A disturbance determined according to input rotational acceleration is added to the position control command provided by the PID regulator C, and the sum of the disturbance and the position control command is given to the block D6. The disturbance based on input rotational acceleration is added to the position control command to enhance the response ability of a speed changing operation for continuously maintaining the output rotating speed $N_3$ constant. Thus, the speed changing operation can be started at the moment when the input rotating speed $N_1$ starts varying and the output rotating speed $N_3$ has not started changing, and hence the output rotating speed $N_3$ can be maintained constant at all times. The rotational acceleration of the engine of the aircraft may be used instead of the input rotational acceleration.

(6) The sum of the disturbance and the control signal given to the block D6 is subjected to a limiting process. If the piston rod position command $Y_{com}$ exceeds an upper limit position, a portion of the piston rod position command $Y_{com}$ exceeding the upper limit is cut and the upper limit is used as the piston rod position command $Y_{com}$. If the piston rod position command $Y_{com}$ is less than a lower limit, the lower limit is used as the piston position command $Y_{com}$. A position that can be specified by the piston position command $Y_{com}$ must be in the range of the upper and the lower limit to avoid slip in the actuator 41 and unstable control.

(7) A limited position control command produced by subjecting the position control command to the limiting process by the block D6 is transferred to the block D7.

(8) An actual piston rod position Y fed back from a piston rod position measuring device is subtracted from the limited position control command during the transfer of the limited position control command to the block D7 to calculate a positional deviation $\Delta Y$ of the limited position control command from the actual position of the piston rod. The feed back of the actual position Y enables to move the piston rod exactly according to the command, and the response characteristic and stability of rotating speed control achieved through the control of the piston rod can be improved.

(9) The positional deviation $\Delta Y$ given to the block D7 is processed using a proportional gain $K_{p2}$ to produce a piston rod position command $\Delta Y_{c2}$. The piston rod position command $Y_{com}$ is given to the block D8.

(10) The piston rod position command $\Delta Y_{c2}$ is processed using a transfer function (proportional gain $K_{val}$) by the block D8 to produce a spool displacement X. The spool displacement X is given to the piston rod operation characteristic element P.

(11) The spool displacement X is converted into a piston rod position Y by the transfer function of the piston rod operation characteristic element P. The piston rod position Y is given to the tilt characteristic element T.

(12) The piston rod position Y is converted into a tilt angle $\Phi$ by the transfer function of the block D11 of the tilt characteristic element T. The tilt angle $\Phi$ is given to the block D12.

(13) The tilt angle $\Phi$ is converted into an output rotating speed (controlled variable) $N_3$ by the transfer function of the block D12.

(14) The output rotating speed $N_3$ is measured by a sensor, not shown, and the measured output rotating speed $N_3$ is fed back to the block D0. Then, a speed change ratio $e_S$ is calculated to repeat the foregoing feedback control operation.

In the first control mode, the speed change ratio $e_S$ of the traction continuously variable speed transmission 11 is maintained so that the generator 2 is driven at the predetermined operating speed when the input rotating speed $N_1$ has reached 4,500 rpm. To be concrete, the traction continuously variable speed transmission 11 is set at the maximum speed change ratio $R_{CVT}$ of 2.0. Upon the increase of the input rotating speed $N_1$ beyond a predetermined level of, for example, 4,500 rpm during operation in the first control mode, the terminals B of the switches SW1 and SW2 are connected to the circuits to start the control operation in the second control mode. The control operation in the second control mode is similar to that in the first control mode except that an output rotating speed deviation $\Delta N_3$ is given to the block D1 in the second control mode and hence the further description of the control operation in the second control mode will be omitted.

If the output rotating speed $N_3$ drops below a predetermined level of, for example, 4,500 rpm due to the stop of the engine or the like during the control operation in the second control mode, the terminals A of the switches SW1 and SW2 are connected to the circuits to execute the control operation in the first control mode.

Figure 12:
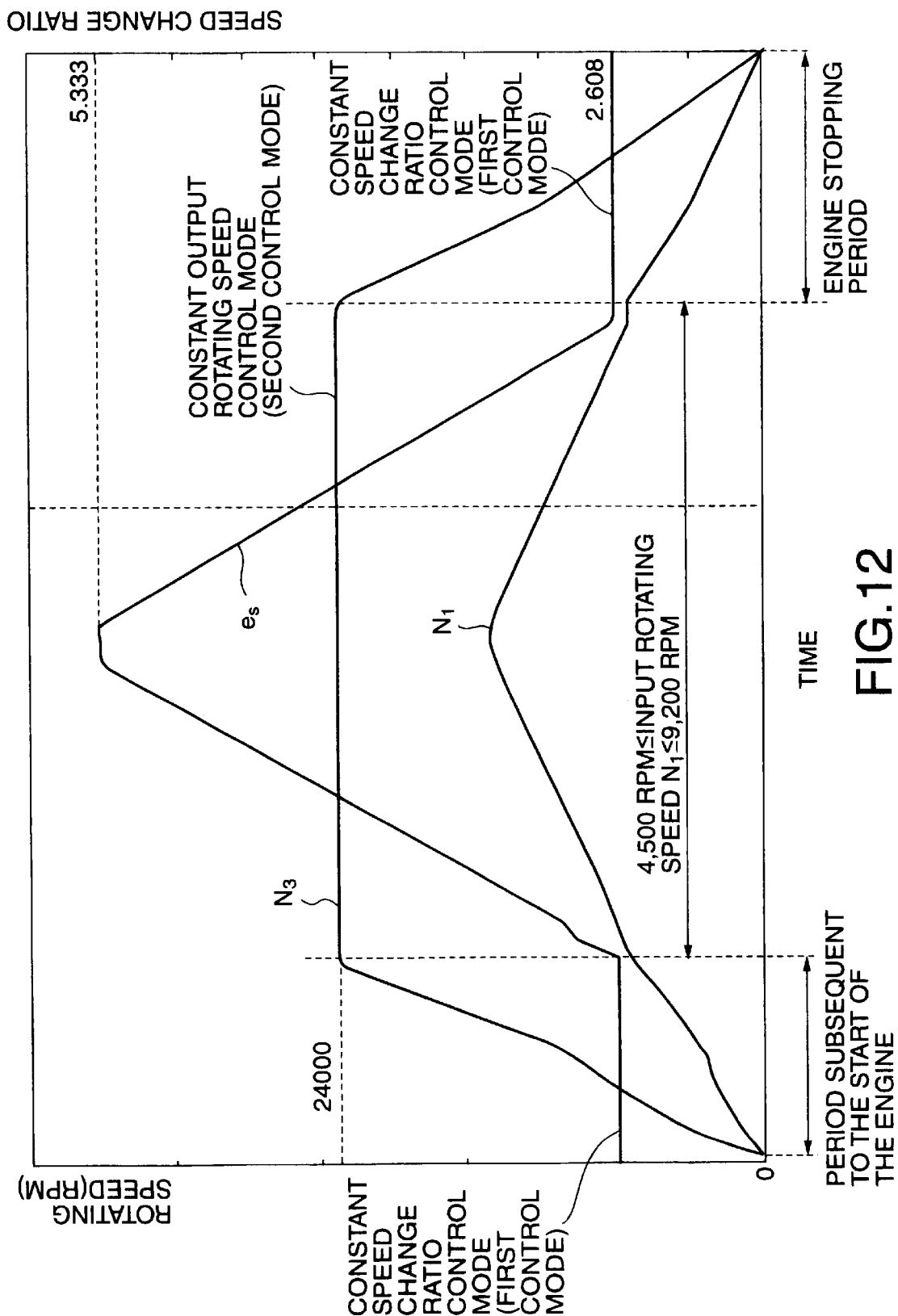
FIG. 12 is a graph of assistance in explaining the relation between input rotating speed and controlled variables.

FIG. 12 is a graph showing, by way of example, the variation of controlled variables with the variation of the input rotating speed $N_1$. As shown in FIG. 12, in a period subsequent to the start of the engine in which the input rotating speed $N_1$ is below 4,500 rpm or in a state where the engine is stopped, a speed change ratio feedback control to maintain the speed change ratio $e_S$ fixed, i.e., the control operation in the first control mode, is executed. In a period where the input rotating speed $N_1$ is in the range of 4,500 to 9,200 rpm, the output rotating speed feedback control to maintain the output rotating speed $N_3$ at a fixed level of, for example, 24,000 rpm, i.e., the control operation in the second control mode, is executed.

EXAMPLES

Examples of the present invention and comparative examples will be described hereinafter.

Example 1 and Comparative Example 1

Figure 13:
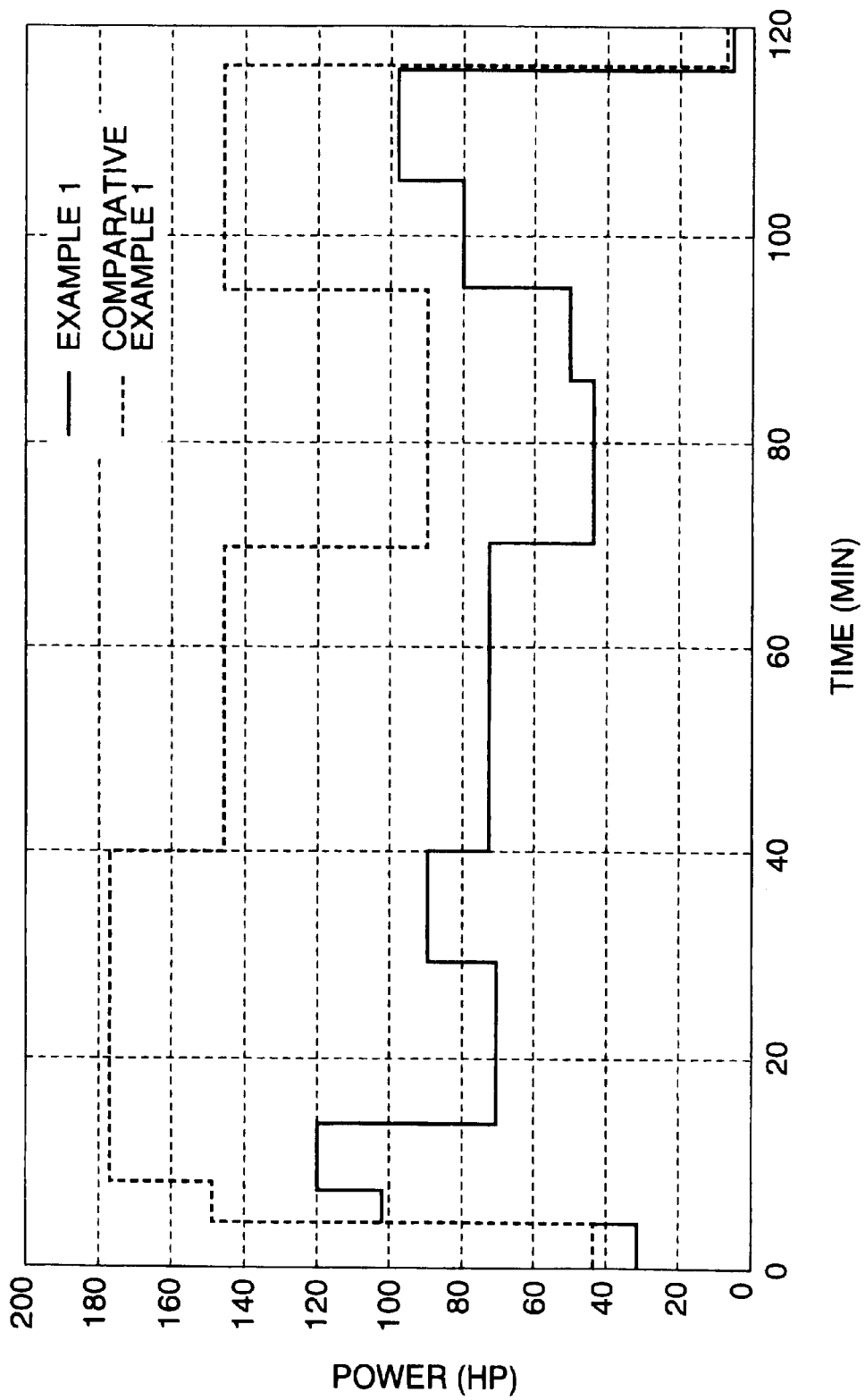
FIG. 13 is a graph comparatively showing the variation of power supplied to a traction continuously variable speed transmission in Example 1 and Comparative example 1 with time under a load for 1000 hr loading tests.

FIG. 13 shows the variation of power demands of the constant-speed driving apparatus in the first embodiment Example 1 and a speed change mechanism (Comparative example 1) provided with only the traction continuously variable speed transmission 11 of the foregoing embodiment in a 1000 hr loading test. Calculated cubic mean quantities of power supplied to the respective traction continuously variable speed transmissions 11 of Example 1 and Comparative example 1 were 49.4 kW and 87.1 kW, respectively. The cubic mean quantity of power supplied to the traction continuously variable speed transmission 11 of Example 1 was about 57% of that supplied to the traction continuously variable speed transmission 11 of Comparative example 1. The life of Example 1 is three times that of Comparative example 1, and the efficiency of Example 1 is higher by 10% than that of Comparative example 1.

Example 2

A constant-speed driving apparatus 3 in Example 2 has the gear trains shown in FIG. 2, in which G1=59, G2=65, G3=64, G4=95, G5=35, G6=25, G7=63, G8=19, G9=93, G10=46, G11=93 and G12=49. The gear trains shown in FIG. 2 is of a single cavity type. Gear trains of a double cavity type are similar to that shown in FIG. 2.

Figure 14:
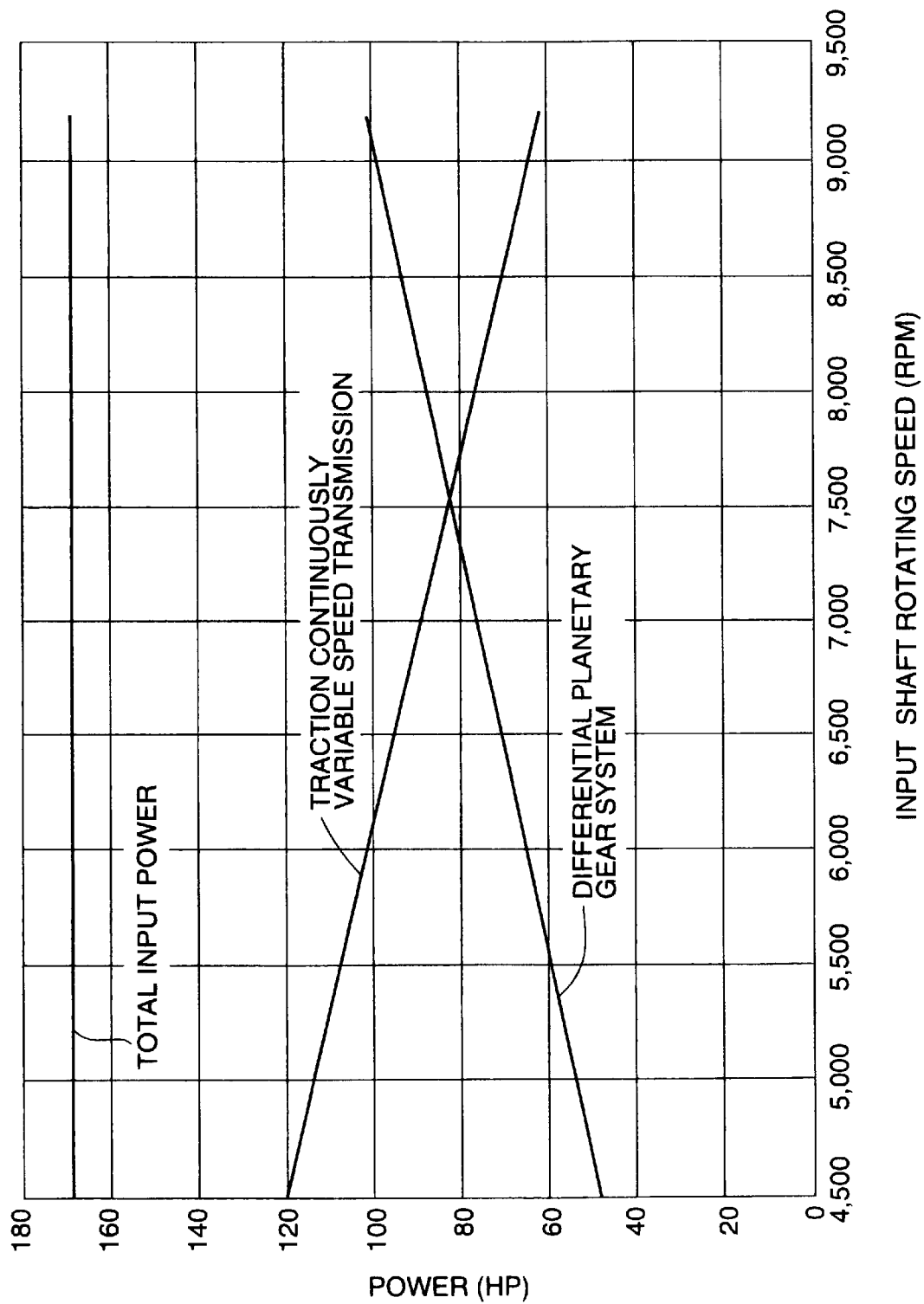
FIG. 14 is a graph of assistance in explaining the variation of power splitting ratio with engine speed in Example 2.

A simulation of power generation using the constant-speed driving apparatus 3 in Example 3 was carried out, in which input power was fixed at 170 HP and the input rotating speed $N_1$ was varied in the range of 4,500 to 9,200 rpm. The results of the simulation are shown in FIG. 14. It is known from FIG. 14, the power split to the traction continuously variable speed transmission 11 decreases and the power split to the differential planetary gear system 12 increases as the input rotating speed $N_1$ increases.

The constant-speed driving apparatus 3 embodying the present invention transmits the rotational driving force of the engine A for driving the generator 2 through both the traction continuously variable speed transmission 11 and the differential planetary gear system 12 to the generator 2 at all times. Therefore, the life of the constant-speed driving apparatus 3 is longer than that of a constant-speed driving apparatus using only the traction continuously variable speed transmission 11. Particularly, when the aircraft is cruising, in which the input rotating speed $N_1$ is about 8,000 rpm, a small part of the driving power is split to the traction continuously variable speed transmission 11, which extends the life of the traction continuously variable speed transmission 11.

The principal components of the differential planetary gear system 12 are disposed coaxially with the traction continuously variable speed transmission 11 between the two cavities 21 and 22 of the traction continuously variable speed transmission 11. The sun gear 12b is fixedly mounted on or formed integrally with the output shaft 16 of the traction continuously variable speed transmission 11. The sun gear 12b serves also as the output shaft 16. The differential planetary gear system 12 and the output disk support mechanism are integrated in a unit. Consequently, the constant-speed driving apparatus 3 can be formed in compact construction.

The life of the aircraft power generating system employing the constant-speed driving apparatus according to the present invention is far longer than the conventional aircraft power generating system employing the hydraulic motor and the hydraulic pump, and the efficiency of the former is higher than that of the latter.

Figure 15:
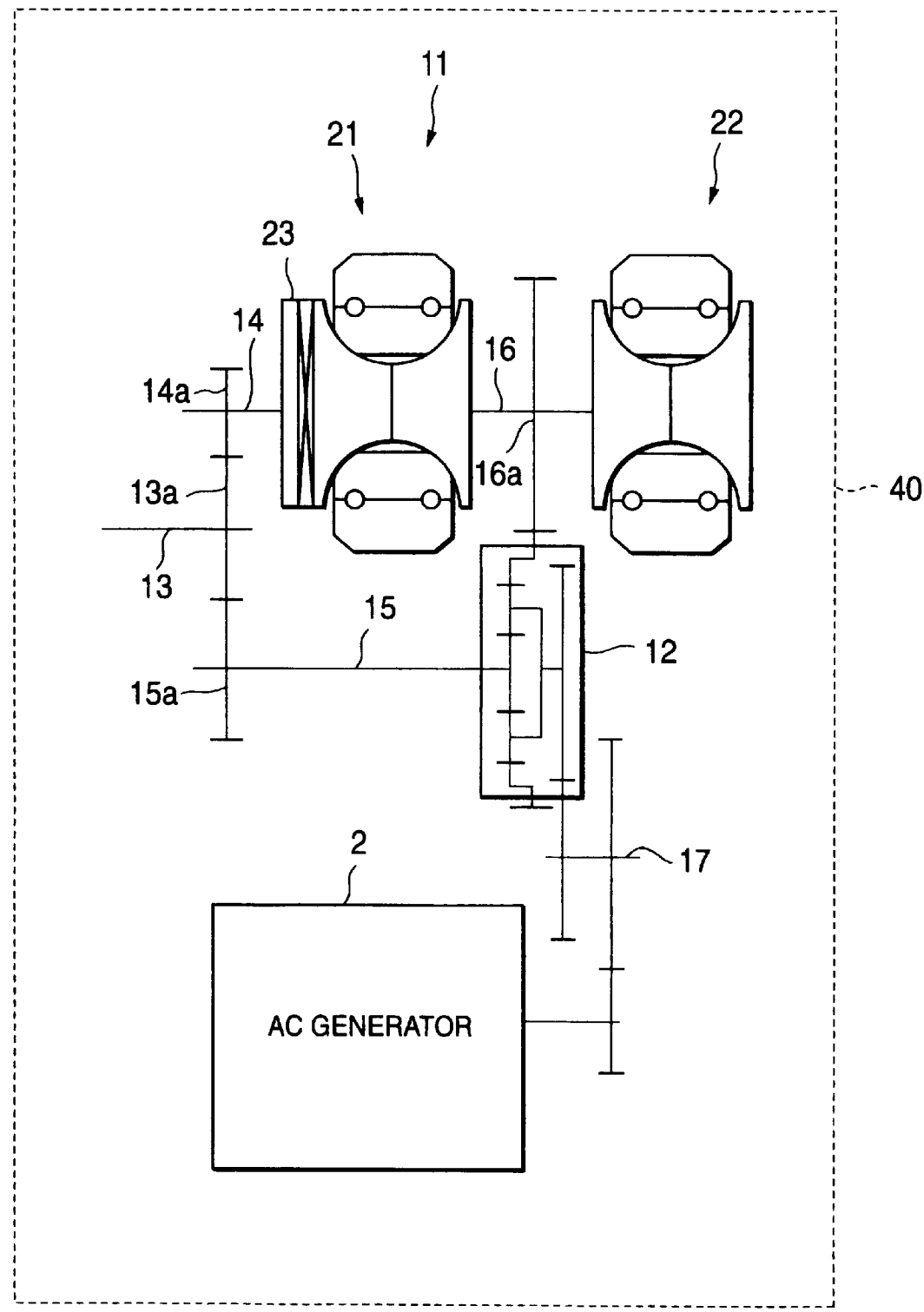
FIG. 15 is a diagrammatic view of an aircraft power generating system including a constant-speed driving apparatus in a second embodiment according to the present invention for driving an aircraft power generator.

FIG. 15 shows a constant-speed driving apparatus in a second embodiment according to the present invention. This constant-speed driving apparatus has a traction continuously variable speed transmission 11 and a differential planetary gear system 12 disposed in parallel to each other. A gear 16a is mounted on the output shaft 16 of the traction continuously variable speed transmission 11. The output shaft 16 is connected to the differential planetary gear system 12 by the gear 16a.

As shown in FIGS. 1 and 15, the with the traction continuously variable speed transmission 11, a generator 2 and driving gear trains can be contained in a single housing 40.

The present invention can be applied to an integrated drive generator (IDG).

As apparent from the foregoing description, according to the present invention, the rotational driving force of the aircraft engine for driving the power generator is transmitted through both the continuously variable speed transmission using the shearing force of a fluid for power transmission and the differential planetary gear system of the constant-speed driving apparatus, and the generator is controlled for operation at a fixed operating speed. Load on each component of the apparatus is reduced because the driving force from the engine is split to continuously variable speed transmission and the differential planetary gear system. Therefore, the constant-speed driving apparatus has a greatly extended life.

The life of the constant-speed driving apparatus of the present invention using the shearing resistance of a fluid for power transmission is far longer than the conventional constant-speed driving apparatus employing the hydraulic motor and the hydraulic pump, and the efficiency of the former is higher than that of the latter. Thus, the constant-speed driving apparatus according to the present invention reduces the fuel consumption of the aircraft.

Preferably, the principal components of the differential planetary gear system are disposed coaxially with the continuously variable speed transmission. As a result, the constant-speed driving apparatus 3 can be formed in compact construction. Therefore, the constant-speed driving apparatus according to the present invention is readily interchangeable with the conventional one.

The relation between the engine speed and the speed change ratio of the traction drive is always on a stable side to improve the stability of control.

The control operation according to the present invention is carried out in either the first control mode, i.e., a constant speed ratio mode, or the second control mode, i.e., a constant output speed mode. Consequently, an optimum control operation can be achieved according to the operating condition of the engine. In a period subsequent to the start of the engine in which the engine speed is below a predetermined level or in a state where the engine is stopped, the traction continuously variable speed transmission does not need to operate for speed change. The control operation in the first control mode is carried out to maintain the speed change ratio of the traction continuously variable speed transmission constant in the rated speed change ratio range to avoid the excessive tilting of the power rollers of the traction continuously variable speed transmission. Consequently, the stable operation of the hydraulic actuator can be ensured. While the engine is in the normal operating condition, the output rotating speed is maintained constant by carrying out the control operation in the second control mode to make the generator generate AC power of a frequency in the specified frequency range. In the second control mode, the output rotating speed is measured, the measured output rotating speed is compared with the output rotating speed command. The deviation of the measured output rotating speed from the output rotating speed command is used as a speed change ratio change command for the feedback control of the output rotating speed. Thus, the traction continuously variable speed transmission is controlled so that the output rotating speed of the traction continuously variable speed transmission coincides at all times with the output rotating speed command regardless of the engine speed of the engine.

The change rate of the input rotating speed of the traction continuously variable speed transmission or the engine speed is added to the speed change ratio change command for the control of the output rotating speed of the traction continuously variable speed transmission to improve the response of the traction continuously variable speed transmission to the variation of the engine speed. Consequently, the difference between the desired output rotating speed and the actual output rotating speed can be greatly reduced even in a transitional state where the engine speed is varying.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A constant-speed driving apparatus for driving an aircraft power generator installed on an aircraft by an engine of the aircraft at a constant-speed, the apparatus comprising:
   a power splitting mechanism that splits an output rotational driving power of the engine into a first split power and a second split power;
   a continuously variable speed transmission to which the first split power is transmitted, the first split power being transmitted via the continuously variable speed transmission by a shearing resistance of a fluid; and
   a differential planetary gear system to which the second split power and an output power of the continuously variable speed transmission are transmitted, the first split power and the second split power being combined in the differential planetary gear system;
   wherein a variation of a rotating speed of the output rotational driving power is absorbed by the continuously variable speed transmission to adjust an output rotating speed of the differential planetary gear system to a constant speed;
   wherein the continuously variable speed transmission comprises a double-cavity toroidal traction drive;
   wherein the differential planetary gear system is disposed coaxially with the continuously variable speed transmission;
   wherein the double-cavity toroidal traction drive comprises output disks which are disposed on opposite sides of the differential planetary gear system, respectively, and an output shaft which supports the output disks; and
   wherein the output shaft of the double-cavity toroidal traction drive also serves as a sun gear of the differential planetary gear system.

2. The constant-speed driving apparatus according to claim 1, wherein the differential planetary gear system further includes a planetary carrier and a ring gear;
   wherein the second split power is transmitted to one of the planetary carrier and the ring gear.

3. The constant-speed driving apparatus according to claim 2, wherein the second split power is transmitted to the ring gear.

4. The constant-speed driving apparatus according to claim 3, wherein the sun gear, the planetary carrier and the ring gear are rotated in a same direction.

5. The constant-speed driving apparatus according to claim 1, wherein the differential planetary gear system comprises a planetary carrier having an external gear; and
   wherein an output of the planetary carrier is transmitted through the external gear.

6. The constant-speed driving apparatus according to claim 1, wherein a speed change ratio of the continuously variable speed transmission decreases with an increase of an engine speed of the engine; and
   wherein the speed change ratio increases with a decrease of the engine speed.

7. A control method of controlling the constant-speed driving apparatus as defined in claim 1, the control method comprising the steps of:
   controlling the continuously variable speed transmission so that a speed change ratio of an output rotating speed of the constant-speed driving apparatus to an input rotating speed of the constant-speed driving apparatus is fixed when an engine speed of the engine is below a predetermined low rotating speed; and
   controlling the continuously variable speed transmission so that the output rotating speed of the constant-speed driving apparatus is fixed when the engine speed of the engine is in a predetermined engine speed range which is above the predetermined low rotating speed.

8. The control method according to claim 7, wherein the output rotating speed of the constant-speed driving apparatus is measured by a rotating speed measuring device; and
   wherein a deviation of the output rotating speed measured by the rotating speed measuring device from the input rotating speed is used as a speed change command signal to be given to the continously variable speed transmission.

9. The control method according to claim 8, wherein a signal produced by adding a change rate of the input rotating speed and the deviation together is used as the speed change command signal to be given to the continuously variable speed transmission.

10. The constant-speed driving apparatus as defined in claim 1, further comprising:
    a controller comprising:
       means for controlling the continuously variable speed transmission so that a ratio of an output rotating speed of the constant-speed driving apparatus to an input rotating speed of the constant-speed driving apparatus is fixed when an engine speed of the engine is below a predetermined low rotating speed, and p2 means for controlling the continuously variable speed transmission so that the output rotating speed of the constant-speed driving apparatus is fixed when the engine speed of the engine is in a predetermined engine speed range which is above the predetermined low rotating speed.

11. The controller according to claim 10, wherein the output rotating speed of the constant-speed driving apparatus is measured by a rotating speed measuring device; and
    wherein a deviation of the output rotating speed measured by the rotating speed measuring device from the input rotating speed is used as a speed change command signal to be given to the continuously variable speed transmission.

12. The controller according to claim 11, wherein a signal produced by adding a change rate of the input rotating speed and the deviation together is used as the speed change command signal to be given to the continuously variable speed transmission.

13. An aircraft power generating system comprising:
    an aircraft power generator;
    the constant-speed driving apparatus as defined in claim 1; and
    a housing containing the constant-speed driving apparatus and the aircraft power generator.

14. A constant-speed driving method of driving an aircraft power generator installed on an aircraft by an engine of the aircraft at a constant-speed using the constant-speed driving apparatus of claim 1, the method comprising the steps of:
    splitting an output rotational driving power of the engine into a first split power and a second split power by the power splitting mechanism;
    transmitting the first split power to the continuously variable speed transmission that transmits the first split power by a shearing resistance of a fluid;
    transmitting the second split power to the differential planetary gear system;

transmitting an output power of the continuously variable speed transmission to the differential planetary gear system to combine the first split power and the second split power in the differential planetary gear system; and absorbing a variation of a rotating speed of the output rotational driving power by the continuously variable speed transmission to adjust an output rotating speed of the differential planetary gear system to a constant speed.

15. The constant-speed driving method according to claim 14, wherein the second split power is transmitted to one of the sun gear, a planetary carrier and a ring gear of the differential planetary gear system; and wherein the output power of the continuously variable speed transmission is transmitted to another one of the sun gear, the planetary carrier and the ring gear.

16. The constant-speed driving method according to claim 15, wherein the second split power is transmitted to one of the sun gear and the ring gear; and wherein the output power of the continuously variable speed transmission is transmitted to another one of the sun gear and the ring gear.

17. The constant-speed driving method according to claim 16, wherein the sun gear, the planetary carrier and the ring gear are rotated in a same direction.

18. The constant-speed driving method according to claim 14, wherein the differential planetary gear system comprises a planetary carrier having an external gear; and wherein an output of the planetary carrier is transmitted through the external gear.

19. The constant-speed driving method according to claim 14, wherein a speed change ratio of the continuously variable speed transmission decreases with an increase of an engine speed of the engine; and wherein the speed change ratio increases with a decrease of the engine speed.

* * * * *